United States Patent

Rhiel et al.

Patent Number: 5,363,905
Date of Patent: Nov. 15, 1994

[54] METHOD OF CONTROLLING HEAT EXCHANGERS USING ENTHALPY FLOW AS THE CORRECTING VARIABLE

[75] Inventors: Franz F. Rhiel, Dormagen-Delhoven; Heinrich Steude; Günther Weymans, both of Leverkusen; Klaus Elgeti, Bergisch Gladbach, all of Germany

[73] Assignee: Bayer Aktiengesellschaft, Leverkusen, Germany

[21] Appl. No.: 24,551

[22] Filed: Mar. 1, 1993

[30] Foreign Application Priority Data

Mar. 6, 1992 [DE] Germany ............................ 4207144

[51] Int. Cl.$^5$ .................... F28F 27/00; G05D 27/00; G01K 17/08
[52] U.S. Cl. ........................................ 165/1; 165/39; 165/40; 374/42; 137/486; 137/487.5; 364/137
[58] Field of Search ............... 165/1, 39, 40; 137/486, 137/487, 487.5; 374/42; 364/137

[56] References Cited

U.S. PATENT DOCUMENTS

| | | |
|---|---|---|
| 3,676,304 | 7/1972 | Hobbs et al. . |
| 4,836,146 | 6/1989 | Russell et al. . |
| 4,932,788 | 6/1990 | Yeh ............................ 374/92 |
| 5,146,941 | 9/1992 | Statler ....................... 137/486 |

FOREIGN PATENT DOCUMENTS

| | | |
|---|---|---|
| 0155826 | 9/1985 | European Pat. Off. . |
| 2263754 | 7/1974 | Germany .................. 374/42 |
| 2421003 | 11/1975 | Germany . |
| 63-071625 | 8/1988 | Japan . |
| 917714 | 2/1963 | United Kingdom ........ 374/42 |

OTHER PUBLICATIONS

Norman A. Anderson, "Instrumentation for Process Measurement and Control" 3rd Edition (1980) pp. 352–355.

Primary Examiner—John K. Ford
Attorney, Agent, or Firm—Sprung Horn Kramer & Woods

[57] ABSTRACT

A method of controlling a heat exchanger wherein the enthalpy flow into the heat exchanger serves as a correcting variable. The robust and versatile control method is particularly suitable for use in endothermic reactions and for distillation.

5 Claims, 2 Drawing Sheets

METHOD OF CONTROLLING HEAT EXCHANGERS USING ENTHALPY FLOW AS THE CORRECTING VARIABLE

BACKGROUND OF THE INVENTION

The invention relates to a method of controlling heat exchangers in order to set a controlled variable on the process side of the heat exchanger.

The invention resides in the field of chemical engineering operations wherein a controlled energy supply is required. On a commercial scale, these energy consumers are generally supplied centrally from a power plant. The steam produced by the power plant is conveyed via a so-called steam line to the individual consumers. At the consumer end, in exceptional cases the incoming steam is fed directly to the process. Mainly, however, only the heat contained in the steam is transmitted to the process via an interposed heat exchanger. The control of the transmitted quantity of energy forms the object of the present invention.

The method customarily used on a commercial level can be described making reference to FIG. 1. In order, for example, to control the temperature in a process (TC), the actual correcting variable, the transmitted energy, is converted into a substitute correcting variable, namely the quantity of steam fed into the heat exchanger 3 followed by steam trap 4. This is illustrated in the drawing by the feed control unit FC which controls the valve 2. The control value employed by the feed control unit is generally the pressure drop $\Delta p$ in the steam across an orifice gauge 5 within the feed line (FIG. 2). Under ideal conditions, i.e. in the case of constant pressure and constant temperature, the volume flow, and thus also the mass flow through the orifice gauge, is proportional to the root of the pressure drop across the orifice gauge (orifice equation).

However, the disadvantage of this known method consists in that changes can occur in the conditions (pressure, temperature) inside a steam line supplying a plurality of consumers from the power plant. For example, even the switching on and off of consumers can give rise to disturbances along a steam line.

SUMMARY OF THE INVENTION

Therefore the aim of the invention was to develop an improved method of controlling the quantity of heat input into a process.

This aim is fulfilled by a method comprising the following steps:
a) Measurement of the mass flow (ṁ) and at least one of the variables, pressure (p) and temperature (T), of the operating medium in the feed line (1) to the heat exchanger (3);
b) Determination of the enthalpy flow into the heat exchanger (3) using the variables measured in a);
c) Use of the enthalpy flow into the heat exchanger (3), defined by b), as a correcting variable for the controlled variable on the process side, where, by changing the enthalpy flow flowing into the heat exchanger (3), the heat exchanger (3) is controlled in accordance with the controlled variable.

The measurement of the variables, pressure (p) and temperature (T), and the determination of the mass flow (ṁ) are carried out using known methods and devices. However, it should be noted that the conventional methods of determining the mass flow (chokes, inductive flow measurement) merely define a volume flow, which can be converted into a mass flow only by multiplication by the density ($\delta$) of the operating medium. Inaccuracies can arise during this conversion unless it is taken into consideration that $\delta$ is dependent upon T and p. The enthalpy flow into the heat exchanger is calculated by multiplying the mass flow (ṁ) by the specific enthalpy ($h_i$) of the operating medium, which latter can be calculated in a manner known per se when the two state variables p and T are known. However, if the operating medium, for example steam, is exactly at a phase boundary, by utilizing the known thermodynamic influences it is sufficient to determine one of the two variables, pressure or temperature, in order to determine the other state variables, thus also the specific enthalpy. This is the case, for example, when steam in the saturated state is used as operating medium.

When the enthalpy flow (Ė) is known, this can be used as a correcting variable. The actual controlled variable, for example the temperature in a chemical engineering process, can be changed by a specified amount when the enthalpy flow into the heat exchanger is increased or reduced by an amount corresponding to this change. In the simplest example this is carried out by a feed control unit (FC) wherein the mass flow into the heat exchanger is controlled by means of a valve.

The new method facilitates a precise, direct control of the quantity of energy fed into a process. The new method of control takes into account interference influences to which the operating medium is subject in the feed line (steam line). These interference influences are thus withheld from the actual process (distillation etc.). The advantage is thus obtained that this process can be controlled within narrower and more precisely definable tolerances. Additionally, a more economical exploitation of produced heat quantities is achieved.

The method can be used advantageously in commercial distillation and rectification columns having diameters exceeding 0.150 m, preferably exceeding 0.5 m, in particular exceeding 1.0 m. By virtue of their inertia, these commercial columns promote a particularly precise means of control.

The temperature represents a preferred controlled variable on the process side as this is the most important process variable in the aforementioned apparatus. However, other variables, such as for example the sump state, can also be controlled by means of the new method.

A preferred embodiment of the new method consists in considering the enthalpy flow issuing from the heat exchanger. This can be achieved by subtracting the specific enthalpy ($h_o$) from the specific enthalpy of the supplied operating medium ($h_i$) and multiplying this difference by the mass flow (ṁ). This is subject to the condition that no mass losses occur in the heat exchanger. When condensate is present, it is sufficient merely to measure the temperature of the condensate in order to determine $h_o$.

A further preferred variant of the method additionally takes into consideration the time response or dynamic response of the heat transfer process. The dynamic response is defined by determining the transmission function. For this purpose, for example, a defined time variation, for example a jump function or a period function or a combination of the two, can be impressed upon the input temperature of the operating medium, and the behaviour of the heat exchanger can be determined by measuring the time variation of the temperature $T_o$ of the operating medium at the output of the heat exchanger. This behaviour is dependent, for example, upon the throughput and the dwell time characteristic of the mass flow in the heat exchanger and upon the heat capacity of the heat exchanger. In contrast to the above described static example wherein the transmitted enthalpy flow E was equated with $\dot{m} \cdot (h_i - h_o)$, in a dynamic example variables such as preferably the idle time $\theta$ and the time constant $\tau$ of the heat exchanger, as well as the time response of the output temperature $T_o$, must be taken into consideration. The following is a particularly preferred formula for determining the transmitted enthalpy flow:

$$E(t) = \dot{m} \cdot \left[ h_i(t - \theta) - h_o(t) - \tau \cdot c \cdot \frac{dT_o(t)}{dt} \right]$$

with:

$$\theta = \frac{K_1}{\dot{V}_k} \,;\, \tau = \tau^b \cdot K_2,\, \tau_b = \frac{V}{\dot{V}_k}$$

wherein
E: transmitted enthalpy
t: time
$\theta$: idle time
$\tau$: time constant
$\tau_b$: calculated dwell time of the heating medium in the heat exchanger
$K_1, K_2$: apparatus (heat exchanger) constants (definable by calculation or experimentally)
V: liquid volume of the heat exchanger on the heating side
$\dot{V}_k$: volume flow of the condensate
$\dot{m}$: mass flow of the heating medium (steam)
h: specific enthalpy of the steam/condensate
T: temperature in °C. (or K)
c: specific heat of the condensate
Indices:
  i: heat exchanger input
  o: heat exchanger output (condensate).

The enthalpy flow can thus be determined from measurable variables using suitably selected electronic modules such as multipliers and differentiators. Programmable microprocessors can also be used for this purpose.

Despite more complex control electronics, this embodiment has the advantage of being able to react more precisely to rapid disturbances in the supply of the operating medium.

In a preferred variant of the method, precise knowledge of the transmitted enthalpy flow in the heat exchanger is utilized to obtain a control system for monitoring the heat transfer behaviour of the apparatus.

The transmitted enthalpy, i.e. the quantity of heat introduced into the process, can be expressed as the product $k \cdot A \cdot \Delta T$. Here $\Delta T$ is the temperature difference between the temperature of the operating medium and the temperature of the process supplied with heat, thus for example the temperature in the sump of a distillation apparatus. A is a gauge of the surface area through which the heat transport takes place, and k is the heat transition coefficient. By comparing the transmitted enthalpy quantity with the change in the temperature difference $\Delta T$, it is possible (assuming A to be constant), to determine a change, for example a deterioration, in the coefficient k.

By monitoring the heat transfer behaviour, such as for example a deterioration, also known as fouling, it is possible, for example, to control a switch-over to clean heat exchangers or switch-off for purposes of cleaning.

BRIEF DESCRIPTION OF THE DRAWINGS

In the following the invention will be explained in the form of an example making reference to the drawing wherein.

DETAILED DESCRIPTION OF THE INVENTION

Figure 1:
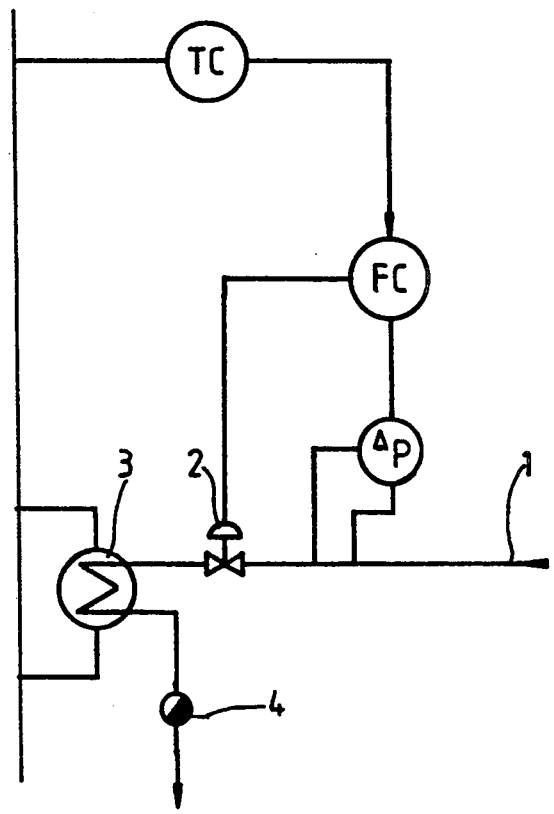
FIGS. 1 and 2 illustrate the known method of controlling the temperature of a process by means of a steam-fed heat exchanger.
Figure 2:
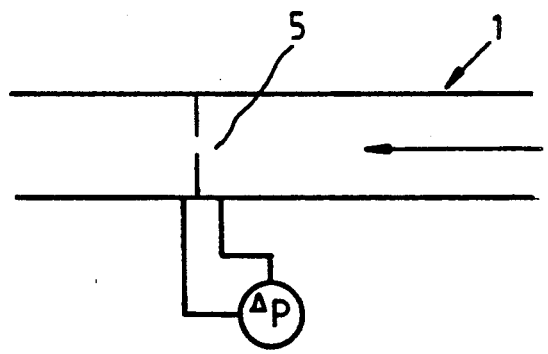
Figure 3:
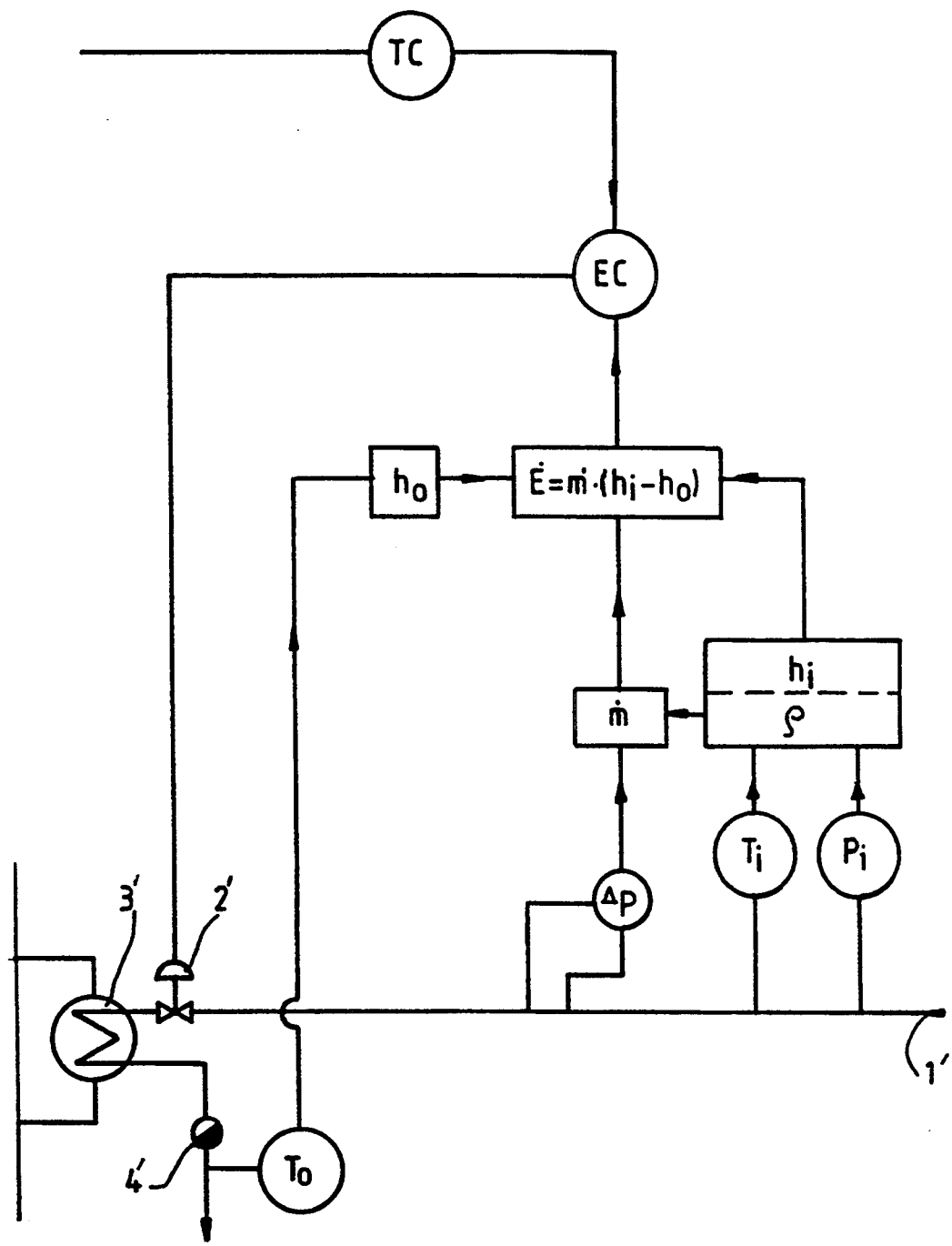
FIG. 3 illustrates the temperature control of the same process in accordance with the new method.

As already described, in accordance with the known methods, the setting of a specific temperature requires that the feed quantity be controlled by means of a valve 2 in dependence upon the measured mass flow through the steam line 1. In the described example the mass flow is determined by measuring the pressure difference $\Delta p$ at the orifice 5 which is positioned in the steam line 1. The quantity of steam controlled in this way is fed into the heat exchanger 3 and produces the desired temperature change in the process.

In accordance with the new method (in this case the embodiment disregarding the dynamic response of the heat exchanger but taking into consideration the enthalpy flow discharged by the condensate), the controlled variable, temperature, is translated not into the correcting variable, feed quantity, but into the correcting variable, enthalpy flow (enthalpy control). A deviation from the theoretical value causes the enthalpy control unit EC to adjust the valve 2'. The enthalpy control unit EC obtains the necessary measured values by measuring the pressure $P_i$ and the temperature $T_i$ in the steam line 1'. From these measured values, the specific enthalpy $h_i$ and the density $\delta$ can be determined by known electronic devices (multipliers etc.) or programmable microprocessors. One method consists in the use of computation sheets with which those skilled in the art will be familiar (e.g. VDI-Wärmeatlas, 6th Edition, 1991, DB 1 to DB 15), wherein the tabulated values serve as aids for the interpolation of intervening values. The mass flow is determined in the known manner using orifice 5 in line 1. The pressure drop $\Delta_p$ across the orifice is measured. From this measured value, firstly the volume flow is determined on the basis of the known orifice equation. Using the state variable $\delta$ defined from the variables $P_i$ and $T_i$, the density of the operating medium, the mass flow m is then determined. To determine the enthalpy flow issuing from the heat exchanger 3' and into steam trap 40' it is sufficient to measure the temperature $T_o$ of the condensate. The enthalpy transmitted in the heat exchanger 3' is calculated by forming the product of mass flow m and the difference between the specific enthalpies $h_i$, $h_o$.

We claim:

1. A method for controlling a heat exchanger, wherein a process controller maintains a process parameter on a process side of the heat exchanger at a set point, the heat exchanger is operated by a heating medium flowing therethrough from a feed line including a valve controlled by an enthalpy controller which is controlled by the process controller, comprising the steps of:

a) measuring mass flow, pressure and temperature of the heating medium input in the feed line to the heat exchanger and temperature of the heating medium output of the heat exchanger;

b) determining from the measurements in step a) and a time response of the heat exchanger, the enthalpy of the heating medium input into the heat exchanger and the enthalpy of the heating medium output from the heat exchanger and forming a difference between the enthalpies to determine the enthalpy flow into the heat exchanger; and c) controlling the enthalpy flow into the heat exchanger by controlling the valve in the feed line such that the enthalpy flow is maintained at a set point, whereby the enthalpy flow into the heat exchanger is changed in response to the process controller.

2. The method according to claim 1, wherein the process parameter is regulated by adjusting the mass flow of the heating medium into the heat exchanger.

3. The method according to claim 1, wherein temperature is the process parameter.

4. The method according to claim 1, further comprising monitoring heat transfer behavior of the heat exchanger by comparing the enthalpy flow from the heat exchanger with changes in the difference between the temperature of the heating medium and the temperature at the process side.

5. The method according to claim 1, wherein the heating medium is steam.

* * * * *